Nov. 6, 1928.  
F. M. REID  
1,690,247  
HEAVY DUTY VEHICLE  
Filed June 23, 1926  
3 Sheets-Sheet 1
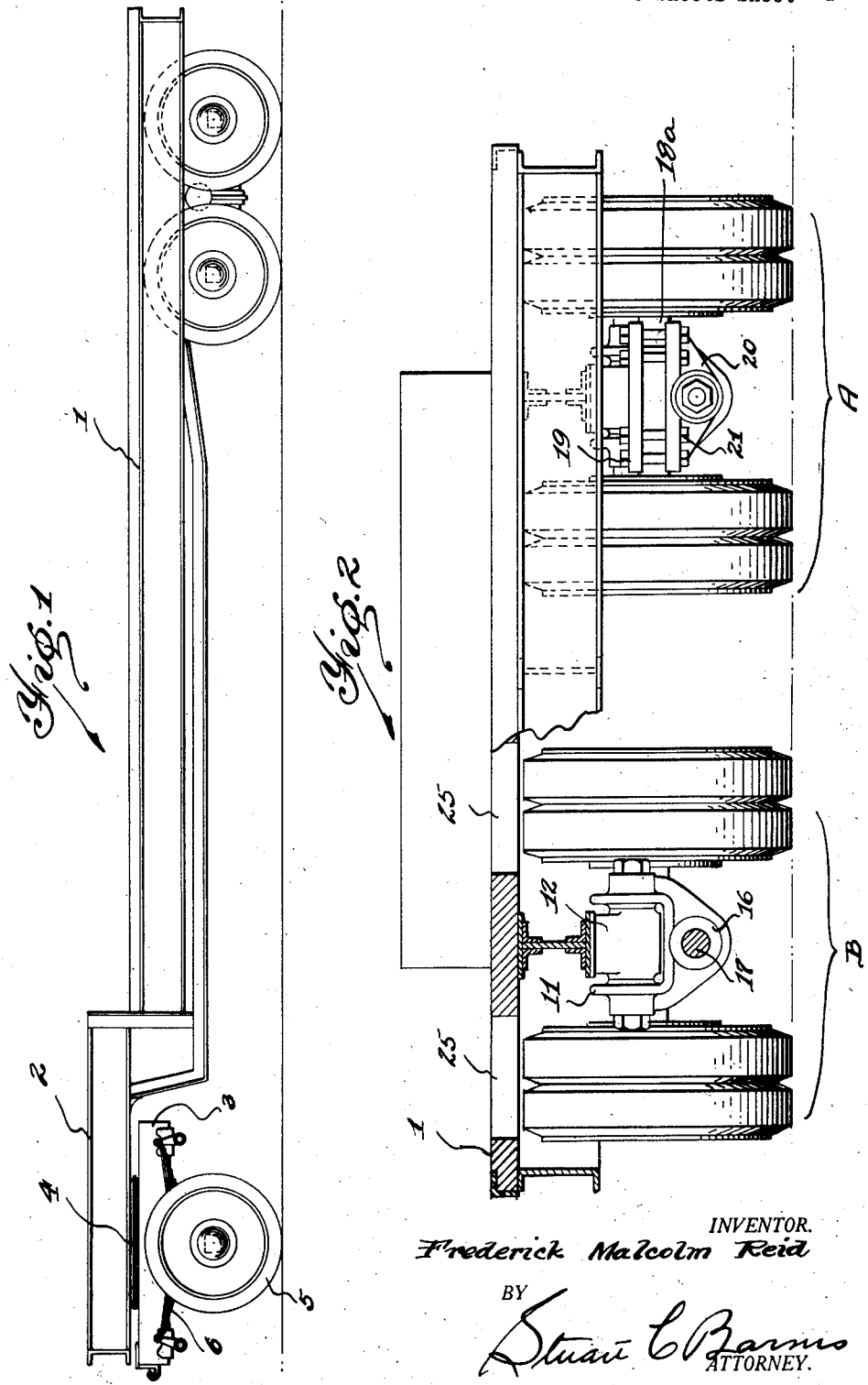
INVENTOR.  
Frederick Malcolm Reid  
BY  
ATTORNEY.

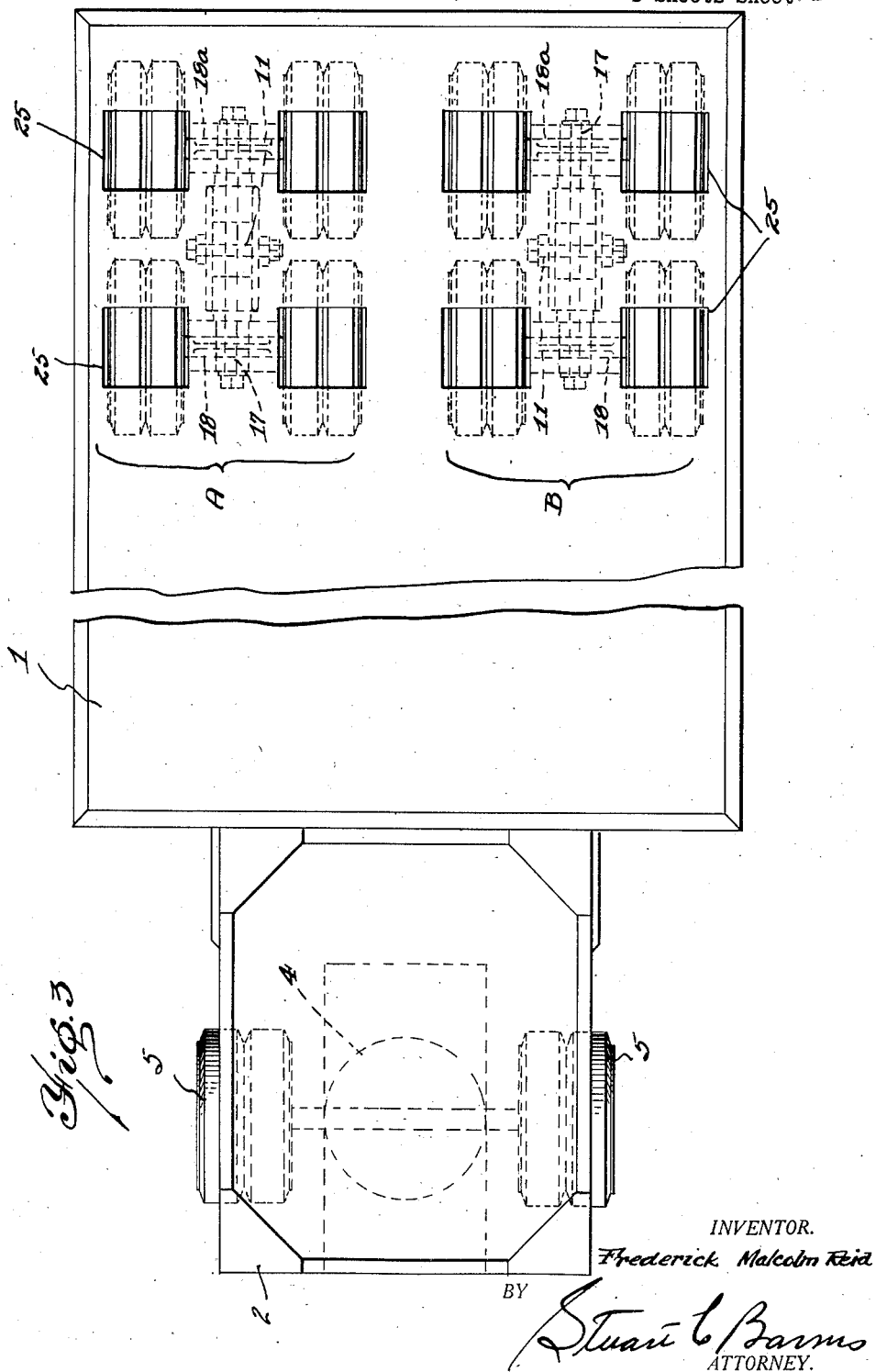

Nov. 6, 1928.

F. M. REID 1,690,247

HEAVY DUTY VEHICLE

Filed June 23, 1926

INVENTOR.
Frederick Malcolm Reid
BY
ATTORNEY.

Patented Nov. 6, 1928.

1,690,247

UNITED STATES PATENT OFFICE.

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN.

HEAVY-DUTY VEHICLE.    REISSUED

Application filed June 23, 1926. Serial No. 117,944.   MAY 26 1942

This invention relates to vehicles and has to do more particularly with vehicles of the heavy duty type for carrying heavy loads.

It is recognized that roads are damaged where insufficient road contact is provided by the wheels of a vehicle. In many places, especially in cities, certain specifications must be complied with in transporting heavy loads, in order that the load be distributed over a sufficient area on the road to prevent damage to the same. Ordinary vehicles, or trucks, have no particular difficulty meeting such specifications, but where excessive loads are to be transported the provision of sufficient area to distribute the weight so that the roadway will not be damaged, presents a difficult problem.

According to the present invention a vehicle is contemplated which is of such a construction that loads in the neighborhood of eighty tons, or more, may be transported. As an example of such a load, the large excavating machines of the type for digging large trenches may be cited. Many of these machines are such that they can move under their own power, but this is exceedingly slow, and in addition to this, the machines are often put out of operating condition by the vibration due to such movement. Heretofore, such machines have been dismantled in order that they may be transported. Dismantling of the machines and moving them under their own power is slow and expensive procedure, and the dismantling is a particularly expensive one. This invention contemplates a vehicle by which these large machines, and other heavy articles, can be quickly carried from one job to another.

A vehicle of this type may take the form of a trailer which is adapted to be drawn by a suitable truck or tractor. According to the invention the vehicle is provided with a multiplicity of wheels to give the same sufficient road contacting area, and these wheels are so mounted as to have movement relative to each other and to the vehicle body for the purpose of accommodating unevenness in the roadway.

An advantageous form of the invention is somewhat diagrammatically shown in the drawings wherein:

Fig. 1 is a side view of the vehicle.

Fig. 2 is a rear view with parts cut away.

Fig. 3 is a diagrammatic plan view.

Figure 4:
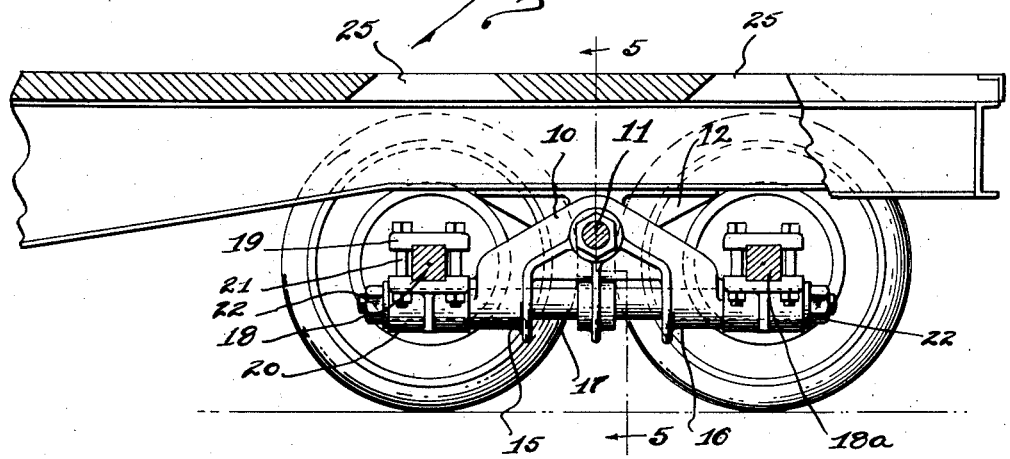
Fig. 4 is a side view showing the wheel mounting.

Referring to the drawings the vehicle is shown as consisting of a frame or platform 1 which is preferably constructed so as to be relatively close to the ground, and the forward end of the frame may be somewhat elevated as at 2. The forward end of the vehicle may be provided with a subframe 3 which supports the main frame 2 through a fifth wheel construction 4. This subframe is mounted on the front wheels 5 by means of springs 6, although the springs may be eliminated if desired. The vehicle is adapted to be drawn by a tractor which is secured to the front end thereof.

The frame, or platform 1, carries the major part of the load, and the rear portion of the frame rests upon a plurality of wheels, eight of such wheels being shown in the present instance.

As indicated in Figs. 2 and 3 the eight wheels are formed into two groups, thus forming two trucks, A and B, composed of four wheels each. These trucks are identical in structure, and a description of one will suffice for both. Each truck includes a yoke member 10, Fig. 4, which may be a casting, and a supporting pin 11 passes through the yoke members of this casting. The vehicle frame is supported, as shown at 12, by a member through which the supporting pin passes, and which lies between the yoke members of the casting 10. The supporting pin 11 may take the form of an ordinary large threaded bolt provided with nuts threaded upon each end.

The yoke member (Figs. 4 and 5) is provided with spaced bearings 15 and 16 through which extends a bolt-like member 17. This bolt-like member supports the axles 18 and 18ª of the forward and rear wheels of the truck. These axles may be of square formation, and may be secured to the bolt-like member by means of a clamp 19, and bracket 20 which are disposed on opposite sides of the axle and secured together by bolts 21. The bracket 20 is rotatably mounted upon the bolt-like member 17, and nuts 22 may be secured to the ends of the bolt, thus holding the brackets 20 in place.

By this construction it will be seen that each truck, A and B, can rock upon the supporting bolt 11 in a vertical plane, and at the same time, the forward pair of wheels, and the rear pair of wheels of each truck can rock upon the shaft 17 in vertical planes which are at right angles to the rocking of the truck as a whole. This construction permits the two trucks to move relative to each other and also permits the forward and rear wheels of each truck to move relative to each other. In this manner irregularities in the road surface are accommodated for, and the load carried by the vehicle is substantially evenly divided among all the wheels. It will be understood that if the wheels were rigidly mounted an irregularity in the roadway would lift one or more wheels from the ground so that they would be suspended in the air thus throwing all the weight on the other wheels, but by this relative movable arrangement each wheel supports its share of weight regardless of such irregularities.

Figure 5:
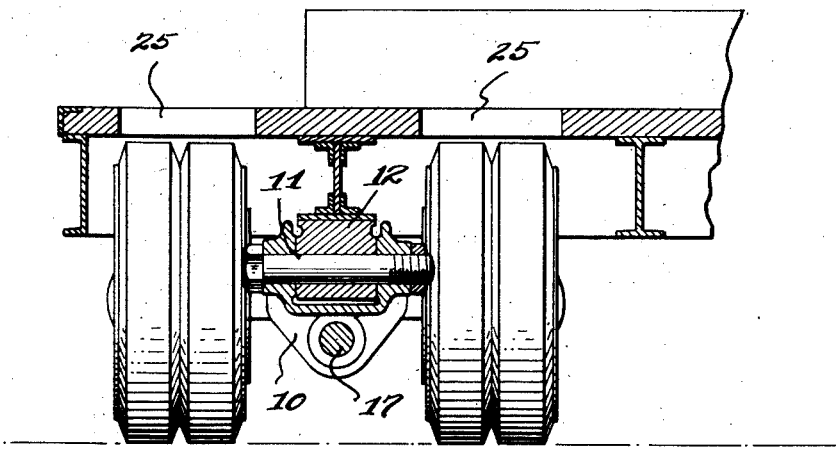
Fig. 5 is a sectional view taken on line 5—5 of Fig. 4.

As indicated in Fig. 5, the platform of the vehicle is positioned relatively low and thus is close to the upper surface of the wheels. It is desirable to have the vehicle of this low construction in order to easily place and remove the loads therefrom, and in order to permit sufficient movement of the truck wheels, the platform may be cut away over each wheel, as at 25. This, of course, would be unnecessary if the platform were sufficiently high to permit such movement of the wheels.

The vehicle shown herein is in the form of a trailer adapted to be transported by being drawn by a tractor, or other powered vehicle. The truck construction, however, which permits relative movement between the wheels may be used in a vehicle which moves under its own power as well as in a trailer. In this case the power might well be transmitted to the front wheels of the vehicles, or may be transmitted to some or all of the rear wheels, as for instance, by means of a chain drive. Also the vehicle can be provided with braking mechanism, and air brakes would be advantageous in a vehicle of this heavy duty type. The drawings show a vehicle which is supported by two trucks each of which are constructed as above described. Such a vehicle is suitable for transporting a load which is in the neighborhood of eighty tons, but the vehicle need not be limited to two trucks as more can be used where the weight of the load requires.

What I claim is:

1. In a heavy duty vehicle, a truck comprising two pairs of wheels for supporting the vehicle, this truck consisting of a compact unit which is secured to the vehicle by a transverse pivotal connection and each pair of wheels being secured to the truck by a longitudinal pivotal connection, whereby the entire truck unit can move relative to the vehicle in a vertical plane only and the pairs of wheels can move relative to the truck in response to road irregularities.

2. In a heavy duty vehicle, a truck comprising two pairs of wheels for supporting the vehicle, this truck being secured to the vehicle by a transverse pivotal connection and each pair of wheels being secured to the truck by a longitudinal pivotal connection which extends in a direction at right angles to the pivotal connection of the truck to the vehicle, whereby the truck can move relative to the vehicle in a vertical plane only, and the pairs of wheels can move relative to the truck in another vertical plane in response to road irregularities.

3. In a heavy duty vehicle, a pair of trucks each comprising a plurality of wheels for supporting the vehicle, each truck being secured to the vehicle on a transverse pivot member so that it can pivot in a vertical plane only relative to the vehicle and independently of the other truck, in response to road irregularities, and the wheels of each truck being connected to their respective truck by a longitudinal pivot member so that they can pivot in a vertical plane independently of other wheels on the same truck, in response to road irregularities, and in a direction which is at right angles to the pivotal movement of the truck.

4. In a heavy duty vehicle, a truck comprising a yoke member, a pin carried by the yoke member which supports the vehicle, a bolt carried by the yoke member which is positioned below the pin and which extends at right angles to the pin, and wheels connected to the bolt and positioned on opposite sides of the pin for supporting the yoke, the said yoke being adapted to rock upon the pin and the wheels being adapted to rock upon the bolt.

5. In a heavy duty vehicle, a truck comprising a yoke member, a pin for connecting the yoke to the vehicle about which the yoke is adapted to turn in a vertical plane, a bolt carried by the yoke member which extends at right angles to the pin, a forward pair of wheels carried by the bolt and a rearward pair of wheels carried by the bolt, each pair of wheels being adapted to pivot in a vertical plane around the bolt independently of each other and independently of the pivotal movement of the yoke.

6. In a heavy duty vehicle, a pair of trucks each comprising yoke members, pins for connecting the yoke members to the vehicle, about which the yokes are adapted to pivot in a vertical plane independently of each other, bolts carried by the yokes which extend at right angles to the pins, a forward pair of wheels carried by each bolt and rearward pair of wheels carried by each bolt, each pair of wheels being adapted to pivot in a vertical plane around the bolts independently of each other and independently of the pivotal movement of the yokes.

7. In a heavy duty vehicle, two four-wheel trucks for supporting one end of the frame, both of said trucks being rigidly secured to the frame by a single pivot member but so that they can pivot relative to the frame in a vertical plane.

8. In a heavy duty vehicle, a frame, two four-wheel trucks for supporting one end of the frame, both of said trucks being secured to the frame by a single pivotal connection so that they can pivot relative to the frame in a vertical plane, the four wheels of each truck being mounted in forward and rearward pairs, each pair of wheels being pivotally carried by the truck so that they can pivot in a vertical plane at right angles to the pivotal plane of the truck.

9. In a heavy duty vehicle, a frame, two four-wheel trucks for supporting one end of the frame, one truck being secured adjacent each side of the frame and both of the said trucks being rigidly secured to the frame by transversely extending pivot pins so that they can pivot in a vertical plane, the four wheels of each truck being mounted in forward and rearward pairs, each pair of wheels being connected to its respective truck by a longitudinally extending pivot pin which permits them to pivot in a vertical plane which is at right angles to the pivotal movement of the truck.

In testimony whereof I affix my signature.

FREDERICK MALCOLM REID.